United States Patent
Kang et al.

(10) Patent No.: US 11,254,873 B2
(45) Date of Patent: Feb. 22, 2022

(54) LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., ltd., Hebei (CN)

(72) Inventors: Sumin Kang, Hebei (CN); Zhian Liang, Hebei (CN); Ruixiang Liang, Hebei (CN); Jiaming Li, Hebei (CN); Guoliang Yun, Hebei (CN); Xuan Zhang, Hebei (CN)

(73) Assignee: SHIJIAZHUANG CHENGZHI YONGHUA DISPLAY MATERIAL, CO., LTD., Hebei (CN)

( * ) Notice: Subject to any disclaimer, the term of this patent is extended or adjusted under 35 U.S.C. 154(b) by 75 days.

(21) Appl. No.: 16/381,275

(22) Filed: Apr. 11, 2019

(65) Prior Publication Data

US 2020/0239777 A1 Jul. 30, 2020

(30) Foreign Application Priority Data

Jan. 29, 2019 (CN) .......................... 201910087677.6

(51) Int. Cl.
| | |
|---|---|
| C09K 19/34 | (2006.01) |
| C09K 19/44 | (2006.01) |
| C09K 19/30 | (2006.01) |
| C09K 19/12 | (2006.01) |
| C09K 19/04 | (2006.01) |

(52) U.S. Cl.
CPC .............. *C09K 19/44* (2013.01); *C09K 19/12* (2013.01); *C09K 19/3003* (2013.01); *C09K 19/3028* (2013.01); *C09K 19/3066* (2013.01); *C09K 19/3098* (2013.01); *C09K 19/3405* (2013.01); *C09K 19/3491* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3036* (2013.01); *C09K 2019/3408* (2013.01)

(58) Field of Classification Search
CPC ...................................................... C09K 19/34
See application file for complete search history.

(56) References Cited

U.S. PATENT DOCUMENTS

| | | | | |
|---|---|---|---|---|
| 2014/0339472 A1* | 11/2014 | Saigusa | .............. | C09K 19/3001 |
| | | | | 252/299.61 |
| 2015/0299161 A1* | 10/2015 | Reiffenrath | .......... | C07D 409/04 |
| | | | | 252/299.61 |
| 2017/0335195 A1* | 11/2017 | Hung | .................. | C09K 19/3066 |
| 2018/0112132 A1* | 4/2018 | Li | ......................... | C09K 19/322 |

FOREIGN PATENT DOCUMENTS

| | | | | |
|---|---|---|---|---|
| CN | 107541220 A | * | 1/2018 | ......... C09K 19/3405 |
| EP | 2921487 A1 | * | 9/2015 | ......... C09K 19/3405 |
| WO | WO-2019107394 A1 | * | 6/2019 | ............. C09K 19/12 |

OTHER PUBLICATIONS

Translation of CN-107541220-A (Year: 2021).*

* cited by examiner

*Primary Examiner* — Chanceity N Robinson
(74) *Attorney, Agent, or Firm* — Muncy, Geissler, Olds & Lowe, PC

(57) ABSTRACT

A liquid crystal composition, and a liquid crystal display element or liquid crystal display including the liquid crystal composition and belonging to the field of liquid crystal display. The liquid crystal composition includes a compound represented by formula I, a compound represented by formula II, one or more compounds represented by formula III, and at least one polymerizable compound. The liquid crystal composition simultaneously has a low rotary viscosity, a large refractive index, and a fast response speed.

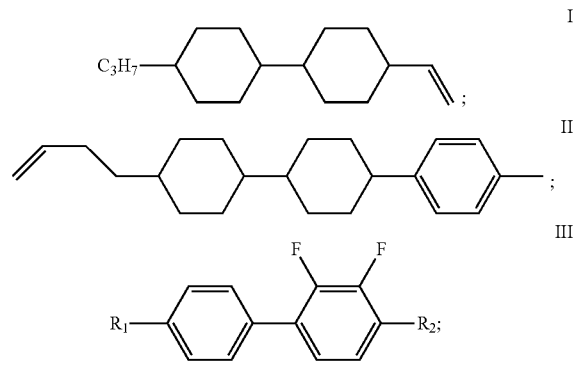

6 Claims, No Drawings

LIQUID CRYSTAL COMPOSITION, LIQUID CRYSTAL DISPLAY ELEMENT AND LIQUID CRYSTAL DISPLAY

TECHNICAL FIELD

The present disclosure belongs to the field of liquid crystal display, and more particularly relates to a liquid crystal composition and a liquid crystal display element or liquid crystal display comprising the liquid crystal composition.

BACKGROUND ART

Early commercial TFT-LCD products basically relate to using a TN display mode, and the largest problem thereof is a narrow viewing angle. With the increase in product size, especially in applications in the TV field, an IPS display mode and a VA display mode, which feature a wide view angle, have been sequentially developed and applied; in particular, on the basis of the improvement of the VA display mode, many big companies have successively made a breakthrough in the development thereof, which mainly depends on the advantages of a wide view angle, a high contrast, no need for rubbing alignment, etc., of the VA mode itself; furthermore, the contrast of the VA mode display is less dependent on the optical anisotropy (Δn) of a liquid crystal, the thickness of a liquid crystal cell (d) and the wavelength (λ) of an incident light, which will inevitably make the VA mode become a very promising display technique.

However, liquid crystal media used for display elements of the VA mode, etc. themselves are not perfect, and compared with positive dielectric anisotropic display elements, they have the disadvantages of a smaller dielectricity, a relatively slow response time, a relatively high drive voltage, etc., and are more prone to the problems of defective displaying, afterimage etc.

At present, liquid crystal compositions which are applicable to display devices and excellent in response speed and in which various display defects are improved are still desired.

SUMMARY OF THE INVENTION

In order to solve the problems in the prior art, the present inventors have conducted intensive studies and surprisingly found that a liquid crystal composition containing a combination represented by a compound represented by formula I, a compound represented by formula II, and a compound represented by formula III as mentioned hereinafter exhibits a fast response speed when applied to a liquid crystal display element, thereby completing the present disclosure.

A first object of the present disclosure is to provide a liquid crystal composition which has a low rotary viscosity and a fast response speed.

A second object of the present disclosure is to provide a liquid crystal display element comprising the liquid crystal composition of the present disclosure. The liquid crystal display element has a fast response speed.

A third object of the present disclosure is to further provide a liquid crystal display comprising the liquid crystal composition of the present disclosure. The liquid crystal display has a fast response speed.

In order to achieve the above-mentioned objects, the following technical solution is used in the present disclosure:

The present disclosure provides a liquid crystal composition comprising a compound represented by formula I, a compound represented by formula II, one or more compounds represented by formula III, and at least one polymerizable compound:

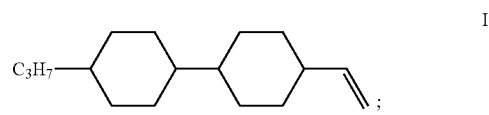

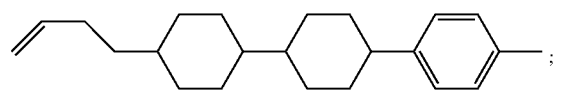

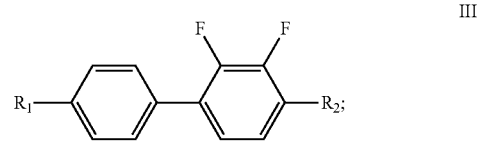

wherein
$R_1$ and $R_2$ each independently represent an alkoxy group having a carbon atom number of 1-10.

In the liquid crystal composition of the present disclosure, there is no limitation on the above-mentioned polymerizable compound, and a person skilled in the art would be able to select a suitable polymerizable compound according to common knowledge in the art.

The present disclosure further provides a liquid crystal display element comprising the liquid crystal composition of the present disclosure, which liquid crystal display element is an active matrix addressing display element or a passive matrix addressing display element.

The present disclosure further provides a liquid crystal display comprising the liquid crystal composition of the present disclosure, which liquid crystal display is an active matrix addressing display or a passive matrix addressing display.

DETAILED DESCRIPTION OF EMBODIMENTS

[Liquid Crystal Composition]

The liquid crystal composition of the present disclosure comprises a compound represented by formula I, a compound represented by formula II, one or more compounds represented by formula III, and at least one polymerizable compound.

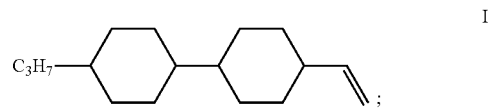

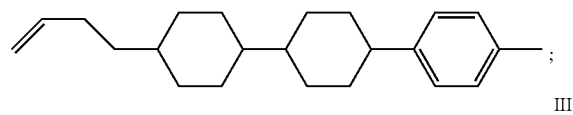

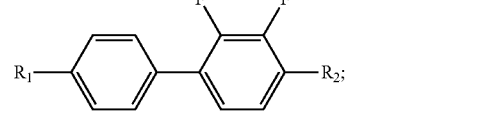

wherein

R₁ and R₂ each independently represent an alkoxy group having a carbon atom number of 1-10.

As the alkoxy group having a carbon atom number of 1-10, examples include methoxy, ethoxy, n-propoxy, isopropoxy, n-butoxy, isobutoxy, pentyloxy, hexyloxy, heptyloxy, octyloxy, nonyloxy, decyloxy etc.

In the liquid crystal composition of the present disclosure, the above-mentioned polymerizable compound is preferably selected from formulas RM-1 to RM-8

RM-1
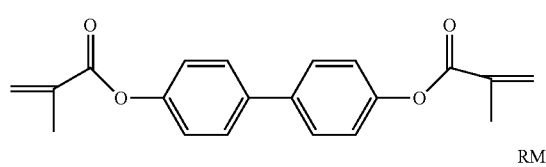

RM-2
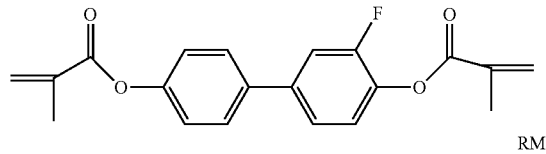

RM-3
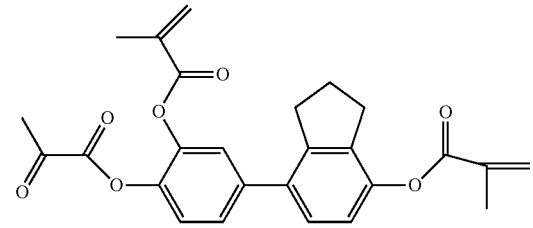

RM-4
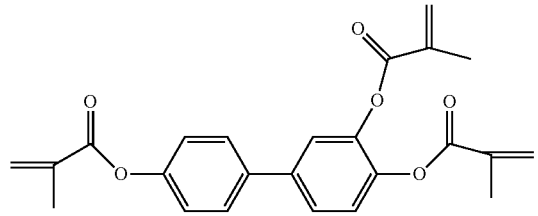

RM-5
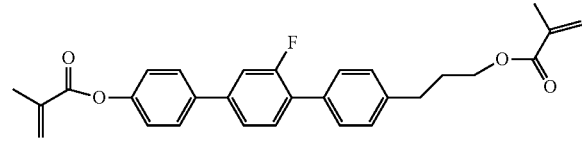

RM-6
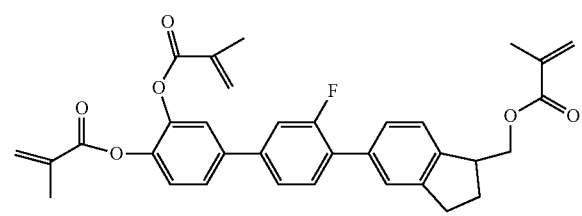

RM-7
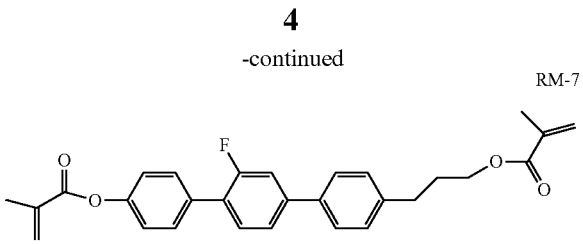

RM-8
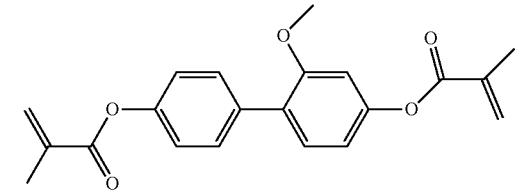

The liquid crystal composition of the present disclosure preferably further comprises one or more compounds represented by formula IV:

IV
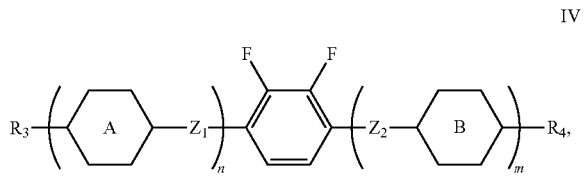

wherein $R_3$ and $R_4$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, and any one or more unconnected $CH_2$ in the groups represented by $R_3$ and $R_4$ are optionally substituted with cyclopentyl, cyclobutyl or cyclopropyl;

$Z_1$ and $Z_2$ each independently represent a single bond, —$CH_2CH_2$— or —$CH_2O$—;

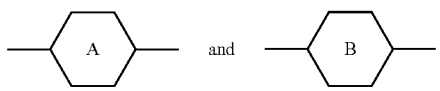

each independently represent 1,4-cyclohexylene, 1,4-cyclohexenylene, 1,4-phenylene or a fluorinated 1,4-phenylene; and m and n each independently represent 0, 1 or 2, with m+n≤2;

furthermore, where m+n=1, $Z_1$ and $Z_2$ are single bonds, and

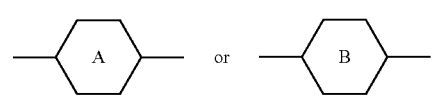

represent 1,4-phenylene, $R_3$ and $R_4$ do not simultaneously represent an alkoxy group having a carbon atom number of 1-10.

In the liquid crystal composition of the present disclosure, preferably, the compound represented by formula IV mentioned above is selected from the group consisting of compounds represented by formula IV-1 to IV-14 below:

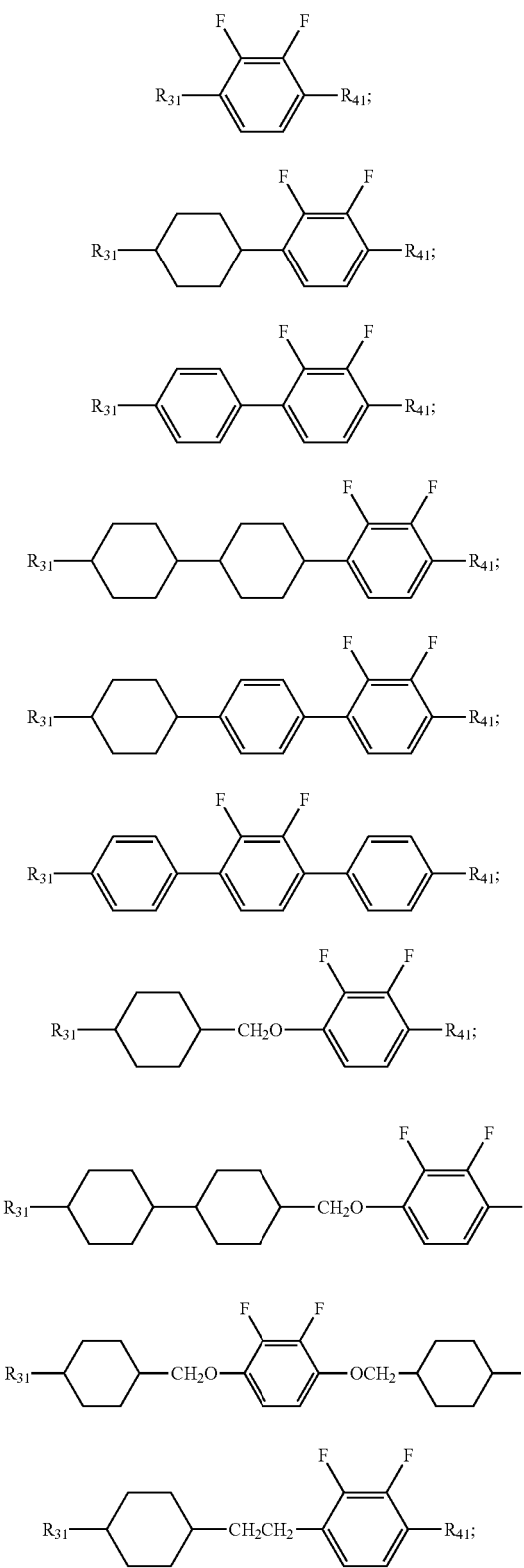

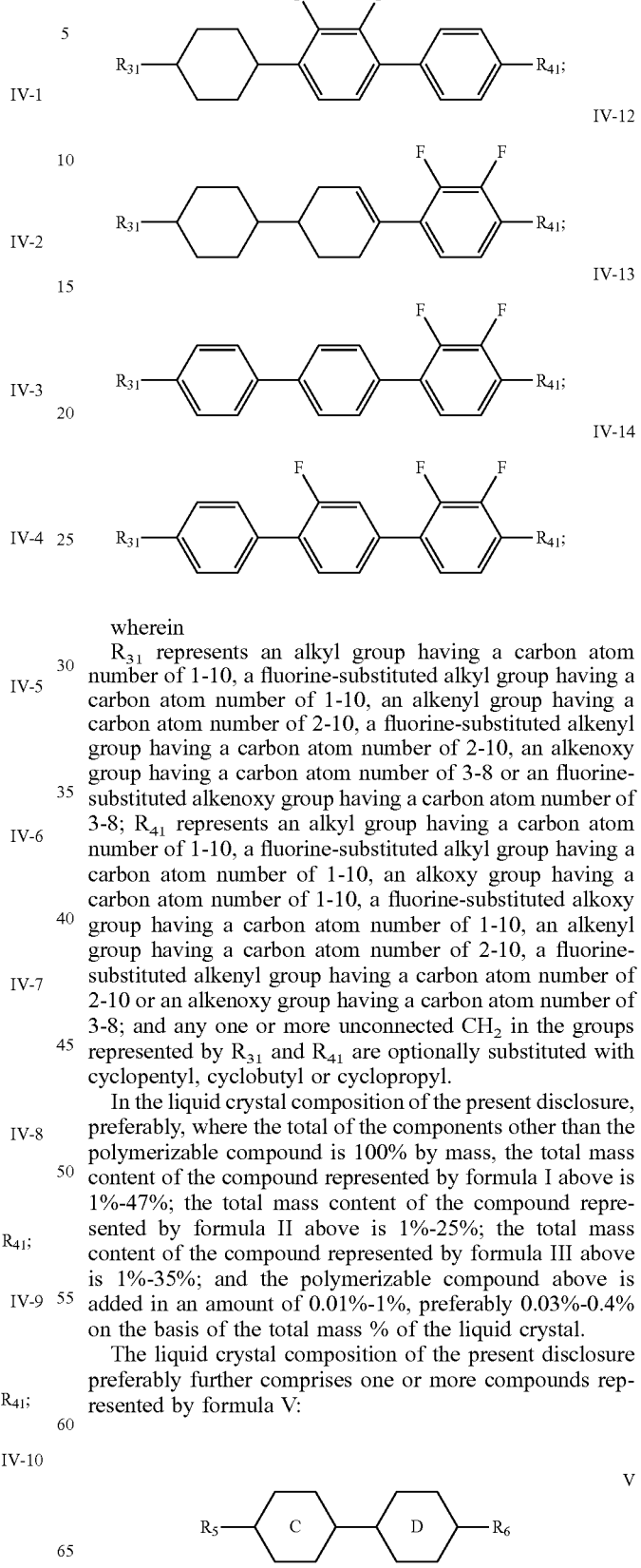

wherein $R_{31}$ represents an alkyl group having a carbon atom number of 1-10, a fluorine-substituted alkyl group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8; $R_{41}$ represents an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10 or an alkenoxy group having a carbon atom number of 3-8; and any one or more unconnected $CH_2$ in the groups represented by $R_{31}$ and $R_{41}$ are optionally substituted with cyclopentyl, cyclobutyl or cyclopropyl.

In the liquid crystal composition of the present disclosure, preferably, where the total of the components other than the polymerizable compound is 100% by mass, the total mass content of the compound represented by formula I above is 1%-47%; the total mass content of the compound represented by formula II above is 1%-25%; the total mass content of the compound represented by formula III above is 1%-35%; and the polymerizable compound above is added in an amount of 0.01%-1%, preferably 0.03%-0.4% on the basis of the total mass % of the liquid crystal.

The liquid crystal composition of the present disclosure preferably further comprises one or more compounds represented by formula V:

wherein $R_5$ and $R_6$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and

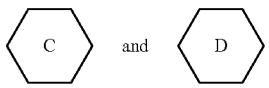

each independently represent 1,4-cyclohexylene, 1,4-cyclohexenylene or 1,4-phenylene; furthermore, where

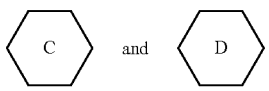

simultaneously represent 1,4-cyclohexylene, and one of $R_5$ and $R_6$ represents propyl, the other one of the $R_5$ and $R_6$ does not represent vinyl.

In the liquid crystal composition of the present disclosure, preferably, the compound represented by formula V mentioned above is selected from the group consisting of compounds represented by formula V-1 to V-3 below:

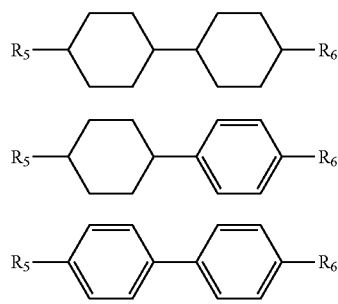

wherein $R_5$ and $R_6$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and in formula V-1, where one of $R_5$ and $R_6$ represents propyl, the other one of the $R_5$ and $R_6$ does not represent vinyl.

The liquid crystal composition of the present disclosure preferably further comprises one or more selected from the group consisting of compounds represented by formula VI-1 to VI-3 below:

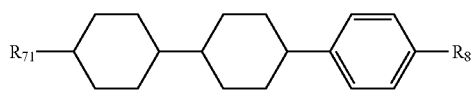

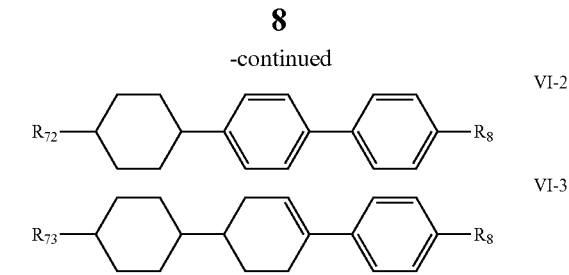

wherein $R_{71}$ represents an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, or vinyl; and $R_{72}$, $R_{73}$ and $R_8$ represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10.

The liquid crystal composition of the present disclosure preferably further comprises one or more compounds represented by formula VII:

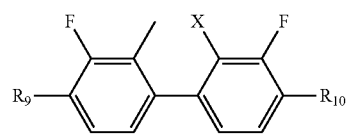

wherein $R_9$ represents an alkyl group having a carbon atom number of 1-10, a fluorine-substituted alkyl group having a carbon atom number of 1-10, an alkoxy group having a carbon atom number of 1-10 or a fluorine-substituted alkoxy group having a carbon atom number of 1-10, and any one or more unconnected $CH_2$ in these groups are optionally substituted with cyclopentyl, cyclobutyl or cyclopropyl;

$R_{10}$ represents an alkyl group having an atom number of 1-10, a fluorine-substituted alkyl group having a carbon atom number of 1-10, an alkoxy group having a carbon atom number of 1-10 or a fluorine-substituted alkoxy group having a carbon atom number of 1-10; and X represents O or S.

In the liquid crystal composition of the present disclosure, preferably, the compound represented by formula VII mentioned above is selected from the group consisting of compounds represented by formula VII-1 to VII-12 below:

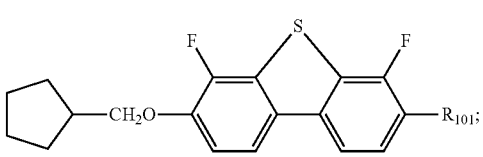

-continued

VII-2 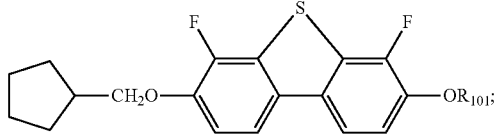

VII-3 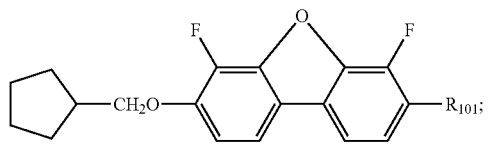

VII-4 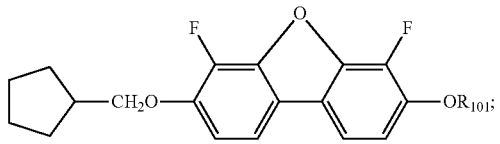

VII-5 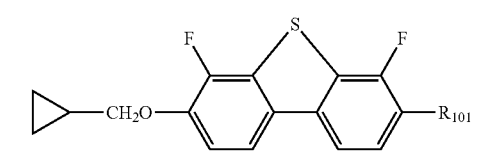

VII-6 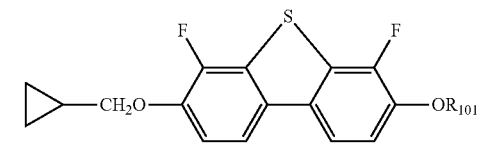

VII-7 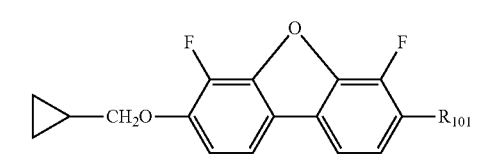

VII-8 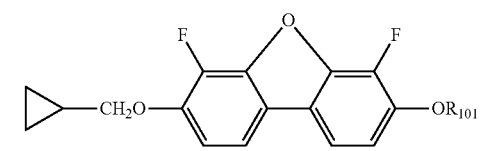

VII-9 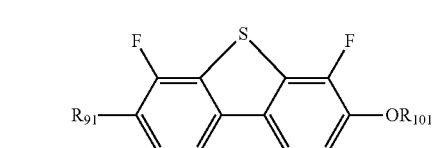

VII-10 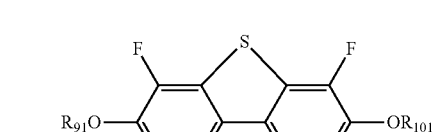

VII-11 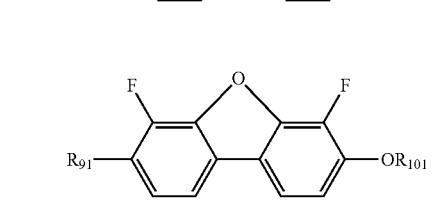

-continued

VII-12 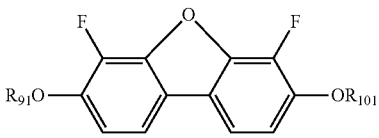

wherein $R_{91}$ and $R_{101}$ represent an alkyl group having a carbon atom number of 1-10.

[Liquid Crystal Display Element]

The liquid crystal display element of the present disclosure comprises the liquid crystal composition of the present disclosure, which liquid crystal display element is an active matrix display element or a passive matrix display element.

Optionally, said liquid crystal display element may be an active matrix liquid crystal display element.

Optionally, said active matrix display element may be, for example, a PSVA-TFT liquid crystal display element.

The liquid crystal display element comprising the liquid crystal composition of the present disclosure has a faster response speed and a smaller cell thickness.

[Liquid Crystal Display]

The liquid crystal display of the present disclosure comprises the liquid crystal composition of the present disclosure, which liquid crystal display is an active matrix display or a passive matrix display.

Optionally, said liquid crystal display may be an active matrix liquid crystal display.

Optionally, said active matrix display may be, for example, a PSVA-TFT liquid crystal display.

The liquid crystal display comprising the liquid crystal composition of the present disclosure has a faster response speed and a smaller cell thickness.

EXAMPLE

In order to more clearly illustrate the present disclosure, the present disclosure is further described below in conjunction with preferred examples. A person skilled in the art should understand that the content described in detail below is illustrative rather than limiting, and should not limit the scope of protection of the present disclosure.

In this description, unless otherwise specified, percentages are mass percentages, temperatures are in degree Celsius (° C.), and the specific meanings of the other symbols and the test conditions are as follows:

Cp represents the clearing point (° C.) of the liquid crystal measured by a DSC quantitative method;

Δn represents optical anisotropy, $n_o$ is the refractive index of an ordinary light, $n_e$ is the refractive index of an extraordinary light, with the test conditions being: 25±2° C., 589 nm and using an abbe refractometer for testing;

Δε represents the dielectric anisotropy, $\Delta\varepsilon = \varepsilon_{//} - \varepsilon_\perp$, wherein $\varepsilon_{//}$ is a dielectric constant parallel to a molecular axis, and $\varepsilon_\perp$ is a dielectric constant perpendicular to the molecular axis, the test condition is 25±0.5° C., a 20 micron parallel cell is used, and INSTEC: ALCT-IR1 is used for the test;

γ1 represents a rotary viscosity (mPa·s), with the test conditions being 25±0.5° C., a 20 micron parallel cell, and INSTEC: ALCT-IR1 for testing; and K11 is twist elastic constant, and K33 is splay elastic constant, with the test conditions being: 25° C., INSTEC: ALCT-IR1, and 18 μm vertical cell;

A method for preparing the liquid crystal composition involves: weighing various liquid crystal monomers at a certain ratio and then placing them in a stainless steel beaker; placing the stainless steel beaker containing these liquid crystal monomers on a magnetic stirring instrument for heating and melting; and after the liquid crystal monomers in the stainless steel beaker are mostly melted, adding a magnetic rotor to the stainless steel beaker; uniformly stirring the mixture; and cooling the mixture to room temperature to obtain the liquid crystal composition.

In the examples of the present disclosure, liquid crystal monomer structures are represented by codes, wherein the codes of cyclic structures, end groups and linking groups of liquid crystals are represented as follows in tables 1 and 2.

TABLE 1

| Corresponding code for ring structure | |
|---|---|
| Ring structure | Corresponding code |
| 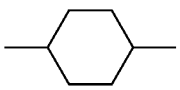 | C |
|  | P |
| 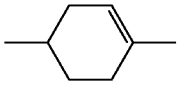 | L |
| 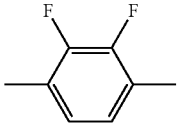 | Y |
| 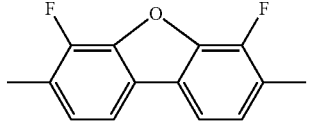 | Sb |
| 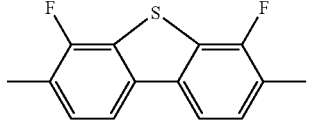 | Sc |

TABLE 2

| Corresponding code for end group and linking group | |
|---|---|
| End group and linking group | Corresponding code |
| $C_nH_{2n+1}$— | n— |
| $C_nH_{2n+1}$O— | nO— |
| —$CF_3$ | —T |
| —$OCF_3$ | —OT |
| —$CH_2O$— | —O— |
| —F | —F |
| —$CH_2CH_2$— | —E— |
| —CH=CH— | —V— |
| —CH=CH—$C_nH_{2n+1}$ | Vn— |
|  | Cp— |

TABLE 2-continued

| Corresponding code for end group and linking group | |
|---|---|
| End group and linking group | Corresponding code |
|  | Cpr— |
| 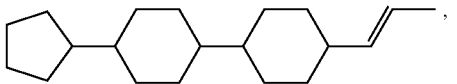 [SMILES: C/C=C/C1CCC(C2CCC(C3CCCC3)CC2)CC1] | Cpr1— |

Examples

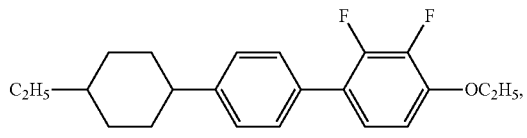 [SMILES: CCOc1ccc(-c2ccc(C3CCC(CC)CC3)cc2)c(F)c1F]

the code of which is CC-Cp-V1;

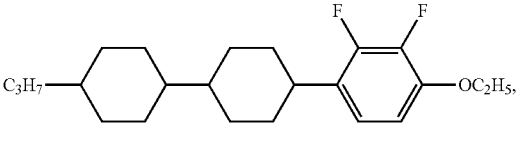

the code of which is CPY-2-O2;

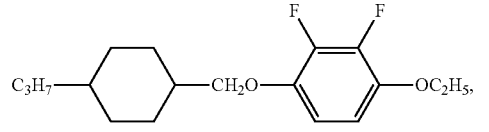

the code of which is CCY-3-O2;

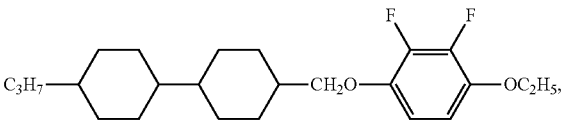

the code of which is COY-3-O2;

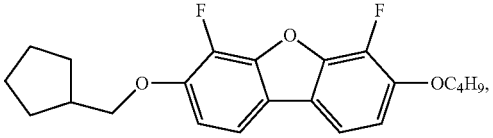

the code of which is CCOY-3-O2;

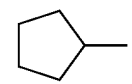

the code of which is Sb-Cp1O-O4; and

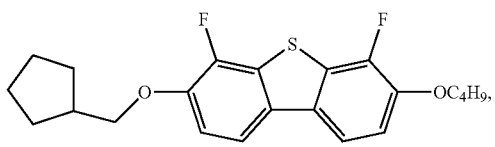

the code of which is Sc-Cp1O-O4.

Example 1

The formulation of the liquid crystal composition and the corresponding properties thereof are as shown in table 3 below.

TABLE 3

Formulation of the liquid crystal composition of Example 1 and the corresponding properties thereof

| Category | Liquid crystal monomer code | Content (in parts by mass) |
|---|---|---|
| I | CC-3-V | 40 |
| II | CCP-V2-1 | 25 |
| III | PY-2O-O2 | 15 |
| III | PY-2O-O4 | 10 |
| III | PY-1O-O2 | 10 |
|  | RM-1 | 1 |

Δε [1 KHz, 25° C.]: −2.4
Δn [589 nm, 25° C.]: 0.105
Cp: 75° C.
$\gamma_1$: 71 mPa · s
K33: 17.6

Comparative Example 1

The formulation of the liquid crystal composition and the corresponding properties thereof are as shown in table 4 below.

TABLE 4

Formulation of the liquid crystal composition of Comparative Example 1 and the corresponding properties thereof

| Category | Liquid crystal monomer code | Content (in parts by mass) |
|---|---|---|
|  | CC-5-V | 40 |
| II | CCP-V2-1 | 25 |
| III | PY-2O-O2 | 15 |
| III | PY-2O-O4 | 10 |
| III | PY-1O-O2 | 10 |
|  | RM-1 | 1 |

Δε [1 KHz, 25° C.]: −2.5
Δn [589 nm, 25° C.]: 0.107
Cp: 78° C.
$\gamma_1$: 95 mPa · s
K33: 18.2

CC-3-V in Example 1 is replaced by CC-5-V to form Comparative Example 1. Compared with Comparative Example 1, Example 1 has no crystal precipitation at normal temperature, and differ to a smaller extent in the properties of dielectricity, refractive index and k value, but has a smaller rotary viscosity γ1 and a smaller γ1/K33, thus resulting in a faster response. It can be seen therefrom that the liquid crystal composition of the present disclosure has a good low-temperature mutual solubility and a fast response speed.

Comparative Example 2

The formulation of the liquid crystal composition and the corresponding properties thereof are as shown in table 5 below.

TABLE 5

Formulation of the liquid crystal composition of Comparative Example 2 and the corresponding properties thereof

| Category | Liquid crystal monomer code | Content (in parts by mass) |
|---|---|---|
| I | CC-3-V | 40 |
|  | CCP-3-1 | 25 |
| III | PY-2O-O2 | 15 |
| III | PY-2O-O4 | 10 |
| III | PY-1O-O2 | 10 |
|  | RM-1 | 1 |

Δε [1 KHz, 25° C.]: −2.3
Δn [589 nm, 25° C.]: 0.104
Cp: 76° C.
$\gamma_1$: 73 mPa · s
K33: 17.2

CCP-V2-1 in Example 1 is replaced by CCP-3-O1 to form Comparative Example 2. Compared with Comparative Example 2, Example 1 has no crystal precipitation at normal temperature, and differ to a smaller extent in the properties of dielectricity, refractive index and k value, but has a smaller rotary viscosity γ1 is and a smaller γ1/K33, thus resulting in a faster response. It can be seen therefrom that the liquid crystal composition of the present disclosure has a good low-temperature mutual solubility and a fast response speed.

Comparative Example 3

The formulation of the liquid crystal composition and the corresponding properties thereof are as shown in table 6 below.

TABLE 6

Formulation of the liquid crystal composition of Comparative Example 3 and the corresponding properties thereof

| Category | Liquid crystal monomer code | Content (in parts by mass) |
|---|---|---|
| I | CC-3-V | 40 |
| II | CCP-V2-1 | 25 |
|  | PY-3-O2 | 15 |
|  | PY-2-O4 | 10 |
|  | PY-1-O2 | 10 |
|  | RM-1 | 1 |

Δε [1 KHz, 25° C.]: −2.1
Δn [589 nm, 25° C.]: 0.098
Cp: 64° C.
$\gamma_1$: 54 mPa · s
K33: 13.5

PY-2O-O2, PY-2O-O4 and PY-1O-O2 in Example 1 are replaced by PY-3-O2, PY-2-O4 and PY-1-O2 to form Comparative Example 3, and by comparing Example 1 with Comparative Example 3, Example 1 has a large dielectricity, a high clearing point, and a large refractive index. It can be seen therefrom that the liquid crystal composition of the present disclosure can be used for the development of a liquid crystal composition having a small cell thickness and a fast response speed.

Example 2

The formulation of the liquid crystal composition and the corresponding properties thereof are as shown in table 7 below.

TABLE 7

Formulation of the liquid crystal composition of Example 2 and the corresponding properties thereof

| Category | Liquid crystal monomer code | Content (in parts by mass) |
|---|---|---|
| I | CC-3-V | 45 |
| II | CCP-V2-1 | 7 |
| III | PY-2O-O2 | 3 |
| III | PY-2O-O4 | 7 |
| IV | CY-3-O2 | 15 |
| IV | PY-3-O2 | 3 |
| IV | CCY-2-O2 | 5 |
| IV | CCY-3-O2 | 11 |
| IV | CPY-3-O2 | 4 |
|  | RM-1 | 0.01 |

$\Delta\epsilon$ [1 KHz, 25° C.]: −3.0
$\Delta n$ [589 nm, 25° C.]: 0.084
Cp: 65° C.
$\gamma_1$: 63 mPa · s
K33: 14.3

Example 3

The formulation of the liquid crystal composition and the corresponding properties thereof are as shown in table 8 below.

TABLE 8

Formulation of the liquid crystal composition of Example 3 and the corresponding properties thereof

| Category | Liquid crystal monomer code | Content (in parts by mass) |
|---|---|---|
| I | CC-3-V | 35 |
| II | CCP-V2-1 | 12 |
| III | PY-2O-O2 | 3 |
| IV | CY-3-O2 | 8 |
| IV | CCY-2-O2 | 7 |
| IV | CCY-3-O2 | 5 |
| IV | COY-3-O2 | 5 |
| IV | PY-3-O2 | 14 |
| IV | CCOY-3-O2 | 11 |
|  | RM-3 | 0.03 |

$\Delta\epsilon$ [1 KHz, 25° C.]: −4.2
$\Delta n$ [589 nm, 25° C.]: 0.078
Cp: 55° C.
$\gamma_1$: 70 mPa · s
K33: 12.3

Example 4

The formulation of the liquid crystal composition and the corresponding properties thereof are as shown in table 9 below.

TABLE 9

Formulation of the liquid crystal composition of Example 4 and the corresponding properties thereof

| Category | Liquid crystal monomer code | Content (in parts by mass) |
|---|---|---|
| I | CC-3-V | 19.5 |
| II | CCP-V2-1 | 9 |
| III | PY-2O-O2 | 5 |
| III | PY-2O-O4 | 10 |
| IV | CY-3-O2 | 7.7 |
| IV | CCY-2-O2 | 7 |
| IV | COY-3-O2 | 5 |
| IV | CCOY-3-O2 | 13 |
| V | CC-3-V1 | 5 |
| V | CC-2-3 | 11 |
| V | CC-4-3 | 3 |
| V | PP-5-1 | 3 |
| V | CP-3-O2 | 1.8 |
|  | RM-3 | 0.36 |

$\Delta\epsilon$ [1 KHz, 25° C.]: −3.6
$\Delta n$ [589 nm, 25° C.]: 0.088
Cp: 68° C.
$\gamma_1$: 87 mPa · s
K33: 15.1

Example 5

The formulation of the liquid crystal composition and the corresponding properties thereof are as shown in table 10 below.

TABLE 10

Formulation of the liquid crystal composition of Example 5 and the corresponding properties thereof

| Category | Liquid crystal monomer code | Content (in parts by mass) |
|---|---|---|
| I | CC-3-V | 5.5 |
| II | CCP-V2-1 | 9 |
| III | PY-2O-O2 | 2 |
| III | PY-2O-O4 | 7 |
| IV | PY-3-O2 | 11 |
| IV | CCOY-3-O2 | 13 |
| IV | CY-3-O2 | 16.5 |
| V | CC-2-3 | 19.5 |
| V | CC-4-3 | 7 |
| VI-1 | CCP-3-O1 | 7 |
| VI-1 | CCP-V-1 | 2.5 |
|  | RM-3 | 0.36 |

$\Delta\epsilon$ [1 KHz, 25° C.]: −3.3
$\Delta n$ [589 nm, 25° C.]: 0.087
Cp: 67° C.
$\gamma_1$: 85 mPa · s
K33: 13.0

Example 6

The formulation of the liquid crystal composition and the corresponding properties thereof are as shown in table 11 below.

TABLE 11

Formulation of the liquid crystal composition of Example 6 and the corresponding properties thereof

| Category | Liquid crystal monomer code | Content (in parts by mass) |
|---|---|---|
| I | CC-3-V | 1 |
| II | CCP-V2-1 | 11 |
| III | PY-2O-O2 | 7 |
| IV | COY-3-O2 | 13 |
| IV | CPY-3-O2 | 11 |
| IV | PY-3-O2 | 13 |
| V | CP-3-O2 | 11 |
| V | CC-2-3 | 7 |
| V | CC-5-3 | 7 |
| VI-1 | CCP-V-1 | 7 |
| VI-2 | CPP-3-2 | 5 |
| VII | Sb-CP1O-O4 | 2 |
| VII | Sc-CP1O-O4 | 5 |
|  | RM | 0.07 |

$\Delta\varepsilon$ [1 KHz, 25° C.]: −3.7
$\Delta n$ [589 nm, 25° C.]: 0.114
Cp: 70° C.
$\gamma_1$: 88 mPa · s
K33: 13.1

Example 7

The formulation of the liquid crystal composition and the corresponding properties thereof are as shown in table 12 below.

TABLE 12

Formulation of the liquid crystal composition of Example 7 and the corresponding properties thereof

| Category | Liquid crystal monomer code | Content (in parts by mass) |
|---|---|---|
| I | CC-3-V | 13.5 |
| II | CCP-V2-1 | 3 |
| III | PY-2O-O2 | 3 |
| III | PY-2O-O4 | 9 |
| IV | PY-3-O2 | 9 |
| IV | COY-3-O2 | 11 |
| IV | CCY-3-O2 | 15 |
| IV | CCOY-3-O2 | 12 |
| V | CC-2-3 | 5 |
| V | CC-4-3 | 9 |
| V | CP-5-O2 | 3.5 |
| V | PP-5-1 | 1 |
| VI-2 | CPP-3-2V1 | 6 |
|  | RM-5 | 0.23 |

$\Delta\varepsilon$ [1 KHz, 25° C.]: −4.0
$\Delta n$ [589 nm, 25° C.]: 0.093
Cp: 52° C.
$\gamma_1$: 72 mPa · s
K33: 10.9

Example 8

The formulation of the liquid crystal composition and the corresponding properties thereof are as shown in table 13 below.

TABLE 13

Formulation of the liquid crystal composition of Example 8 and the corresponding properties thereof

| Category | Liquid crystal monomer code | Content (in parts by mass) |
|---|---|---|
| I | CC-3-V | 29.5 |
| II | CCP-V2-1 | 5 |
| III | PY-2O-O2 | 1 |
| IV | PY-3-O2 | 11 |
| IV | CCY-3-O2 | 10.5 |
| IV | CCOY-3-O2 | 12 |
| V | CC-2-3 | 5 |
| V | CP-3-O2 | 5 |
| V | CC-3-V1 | 8 |
| VI-1 | CCP-V-1 | 7 |
| VI-2 | CPP-3-2 | 3 |
| VII | Sb-Cp1O-O4 | 3 |
|  | RM-4 | 0.38 |

$\Delta\varepsilon$ [1 KHz, 25° C.]: −2.8
$\Delta n$ [589 nm, 25° C.]: 0.089
Cp: 82° C.
$\gamma_1$: 83 mPa · s
K33: 17.0

Comparative Example 4

The formulation of the liquid crystal composition and the corresponding properties thereof are as shown in table 14 below.

TABLE 14

Formulation of the liquid crystal composition of Comparative Example 4 and the corresponding properties thereof

| Category | Liquid crystal monomer code | Content (in parts by mass) |
|---|---|---|
| I | CC-3-V | 29.5 |
|  | CCP-3-1 | 5 |
| III | PY-2O-O2 | 1 |
| IV | PY-3-O2 | 11 |
| IV | CCY-3-O2 | 10.5 |
| IV | CCOY-3-O2 | 12 |
| V | CC-2-3 | 5 |
| V | CP-3-O2 | 5 |
| V | CC-3-V1 | 8 |
| VI-1 | CCP-V-1 | 7 |
| VI-2 | CPP-3-2 | 3 |
| VII | Sb-Cp1O-O4 | 3 |
|  | RM-4 | 0.38 |

$\Delta\varepsilon$ [1 KHz, 25° C.]: −2.8
$\Delta n$ [589 nm, 25° C.]: 0.088
Cp: 81° C.
$\gamma_1$: 88 mPa · s
K33: 17.1

CCP-V2-1 in Example 8 is replaced by CCP-3-1 to form Comparative Example 4. Compared with Comparative Example 4, Example 8 differ to a smaller extent in the properties of dielectricity, refractive index, cleaning point and K33; however, Example 8 has a smaller $\gamma_1$, a smaller $\gamma_1/K33$, and a faster response. It can be seen therefrom that the liquid crystal composition of the present disclosure has the advantage of a fast response speed, and when applied to the manufacture procedure for an ODF liquid crystal display device, there is no defective displaying in the liquid crystal display device.

Example 9

The formulation of the liquid crystal composition and the corresponding properties thereof are as shown in table 15 below.

TABLE 15

Formulation of the liquid crystal composition of Example 9 and the corresponding properties thereof

| Category | Liquid crystal monomer code | Content (in parts by mass) |
| --- | --- | --- |
| I | CC-3-V | 13.5 |
| II | CCP-V2-1 | 10 |
| III | PY-2O-O2 | 5 |
| IV | PY-3-O2 | 3 |
| IV | CCY-3-O2 | 11 |
| IV | CCOY-3-O2 | 7 |
| IV | COY-3-O2 | 10 |
| V | CC-2-3 | 12 |
| V | CC-5-3 | 7 |
| V | PP-5-O2 | 9 |
| VI-1 | CCP-3-O1 | 7 |
| VI-2 | CPP-1V-2 | 5.5 |
|  | RM-5 | 0.25 |

$\Delta\varepsilon$ [1 KHz, 25° C.]: −2.7
$\Delta n$ [589 nm, 25° C.]: 0.100
Cp: 91° C.
$\gamma_1$: 91 mPa · s
K33: 18

Example 10

The formulation of the liquid crystal composition and the corresponding properties thereof are as shown in table 16 below.

TABLE 16

Formulation of the liquid crystal composition of Example 10 and the corresponding properties thereof

| Category | Liquid crystal monomer code | Content (in parts by mass) |
| --- | --- | --- |
| I | CC-3-V | 19 |
| II | CCP-V2-1 | 11 |
| III | PY-2O-O2 | 5 |
| IV | COY-3-O2 | 13 |
| IV | PY-3-O2 | 15 |
| IV | LY-Cp-O2 | 3 |
| V | CC-4-3 | 2.5 |
| V | CC-5-3 | 5 |
| V | CP-3-O2 | 1 |
| VI-1 | CCP-V-1 | 5 |
| VI-2 | CPP-3-2 | 2.5 |
| VI-1 | CCP-3-O1 | 2 |
| VI-2 | CPP-1V-2 | 1 |
| VI-2 | CPP-3-2V1 | 7 |
| VII | Sc-Cp1O-O4 | 8 |
|  | RM-1 | 0.15 |

$\Delta\varepsilon$ [1 KHz, 25° C.]: −3.0
$\Delta n$ [589 nm, 25° C.]: 0.107
Cp: 70° C.
$\gamma_1$: 66 mPa · s
K33: 12.7

Example 11

The formulation of the liquid crystal composition and the corresponding properties thereof are as shown in table 17 below.

TABLE 17

Formulation of the liquid crystal composition of Example 11 and the corresponding properties thereof

| Category | Liquid crystal monomer code | Content (in parts by mass) |
| --- | --- | --- |
| I | CC-3-V | 35 |
| II | CCP-V2-1 | 12 |
| III | PY-2O-O2 | 11 |
| III | PY-2O-O4 | 18 |
| III | PY-1O-O4 | 1 |
| V | CC-2-3 | 5 |
| V | CC-4-3 | 7 |
| V | CP-5-O2 | 9 |
| V | CP-3-O2 | 2 |
|  | RM-4 | 0.33 |

$\Delta\varepsilon$ [1 KHz, 25° C.]: −2.1
$\Delta n$ [589 nm, 25° C.]: 0.091
Cp: 60° C.
$\gamma_1$: 61 mPa · s
K33: 13.2

Example 12

The formulation of the liquid crystal composition and the corresponding properties thereof are as shown in table 18 below.

TABLE 18

Formulation of the liquid crystal composition of Example 12 and the corresponding properties thereof

| Category | Liquid crystal monomer code | Content (in parts by mass) |
| --- | --- | --- |
| I | CC-3-V | 17 |
| II | CCP-V2-1 | 5 |
| III | PY-2O-O2 | 8 |
| IV | PY-3-O2 | 13 |
| IV | COY-3-O2 | 11 |
| IV | CCOY-2-O2 | 14 |
| IV | CCOY-3-O2 | 15 |
| VI-2 | CPP-3-2 | 3 |
| VI-1 | CCP-3-1 | 2 |
| VI-1 | CCP-V-1 | 7 |
| VI-2 | CPP-1V-2 | 2 |
| VI-2 | CPP-3-2V1 | 3 |
|  | RM-3 | 0.29 |

$\Delta\varepsilon$ [1 KHz, 25° C.]: −4.5
$\Delta n$ [589 nm, 25° C.]: 0.109
Cp: 87° C.
$\gamma_1$: 141 mPa · s
K33: 16.8

Example 13

The formulation of the liquid crystal composition and the corresponding properties thereof are as shown in table 19 below.

TABLE 19

Formulation of the liquid crystal composition of Example 13 and the corresponding properties thereof

| Category | Liquid crystal monomer code | Content (in parts by mass) |
|---|---|---|
| I | CC-3-V | 33 |
| II | CCP-V2-1 | 9 |
| III | PY-2O-O2 | 5 |
| III | PY-2O-O4 | 9 |
| IV | CY-3-O2 | 5 |
| IV | CPY-3-O2 | 11 |
| IV | CCOY-3-O2 | 7 |
| VI-1 | CCP-3-1 | 3 |
| VI-1 | CCP-V-1 | 9 |
| VI-2 | CPP-1V-2 | 2 |
| VII | Sb-4O-O4 | 2 |
| VII | Sc-2O-O4 | 5 |
|  | RM-1 | 0.09 |

$\Delta\varepsilon$ [1 KHz, 25° C.]: −3.2
$\Delta n$ [589 nm, 25° C.]: 0.110
Cp: 90° C.
$\gamma_1$: 96 mPa · s
K33: 18.5

Comparative Example 5

The formulation of the liquid crystal composition and the corresponding properties thereof are as shown in table 20 below.

TABLE 20

Formulation of the liquid crystal composition of Comparative Example 5 and the corresponding properties thereof

| Category | Liquid crystal monomer code | Content (in parts by mass) |
|---|---|---|
| I | CC-3-V | 33 |
|  | CCP-3-O1 | 9 |
| III | PY-2O-O2 | 5 |
| III | PY-2O-O4 | 9 |
| IV | CY-3-O2 | 5 |
| IV | CPY-3-O2 | 11 |
| IV | CCOY-3-O2 | 7 |
| VI-1 | CCP-3-1 | 3 |
| VI-1 | CCP-V-1 | 9 |
| VI-2 | CPP-1V-2 | 2 |
| VII | Sb-4O-O4 | 2 |
| VII | Sc-2O-O4 | 5 |
|  | RM-1 | 0.09 |

$\Delta\varepsilon$ [1 KHz, 25° C.]: −3.1
$\Delta n$ [589 nm, 25° C.]: 0.111
Cp: 90° C.
$\gamma_1$: 106 mPa · s
K33: 18.5

CCP-V2-1 in Example 13 is replaced by CCP-3-O1 to form Comparative Example 5. Compared with Comparative Example 5, Example 13 differ to a smaller extent in the properties of dielectricity, refractive index, cleaning point and K33; however, Example 13 has a smaller $\gamma_1$, a smaller $\gamma_1$/K33, and a faster response. It can be seen therefrom that the liquid crystal composition of the present disclosure has the advantage of a fast response.

Example 14

The formulation of the liquid crystal composition and the corresponding properties thereof are as shown in table 21 below.

TABLE 21

Formulation of the liquid crystal composition of Example 14 and the corresponding properties thereof

| Category | Liquid crystal monomer code | Content (in parts by mass) |
|---|---|---|
| I | CC-3-V | 19 |
| II | CPP-V2-1 | 5 |
| III | PY-2O-O2 | 5 |
| III | PY-2O-O4 | 10 |
| IV | PY-3-O2 | 7 |
| IV | COY-3-O2 | 7 |
| IV | CCOY-3-O2 | 12 |
| V | CC-2-3 | 20 |
| V | CC-5-3 | 3 |
| V | CP-5-O2 | 4 |
| VII | Sb-Cp1O-O4 | 3 |
| VII | Sc-Cp1O-O2 | 5 |
|  | RM-2 | 0.33 |

$\Delta\varepsilon$ [1 KHz, 25° C.]: −4.1
$\Delta n$ [589 nm, 25° C.]: 0.090
Cp: 53° C.
$\gamma_1$: 74 mPa · s
K33: 11.5

Example 15

The formulation of the liquid crystal composition and the corresponding properties thereof are as shown in table 22 below.

TABLE 22

Formulation of the liquid crystal composition of Example 15 and the corresponding properties thereof

| Category | Liquid crystal monomer code | Content (in parts by mass) |
|---|---|---|
| I | CC-3-V | 13 |
| II | CCP-V2-1 | 5 |
| III | PY-2O-O2 | 3 |
| III | PY-2O-O4 | 5 |
| IV | PY-3-O2 | 3 |
| IV | CCY-3-O2 | 9 |
| IV | CCOY-3-O2 | 13 |
| V | CC-2-3 | 19 |
| V | CC-4-3 | 5 |
| V | CC-3-V1 | 3 |
| V | CP-5-O2 | 3 |
| VI-1 | CCP-V-1 | 7 |
| VI-2 | CPP-1V-2 | 3 |
| VI-1 | CPP-3-2 | 4 |
| VII | Sb-Cp1O-O4 | 3 |
| VII | Sc-Cp1O-O2 | 2 |
|  | RM-4 | 0.31 |

$\Delta\varepsilon$ [1 KHz, 25° C.]: −3.0
$\Delta n$ [589 nm, 25° C.]: 0.095
Cp: 88° C.
$\gamma_1$: 107 mPa · s
K33: 16.9

Comparative Example 6

The formulation of the liquid crystal composition and the corresponding properties thereof are as shown in table 23 below.

TABLE 23

Formulation of the liquid crystal composition of Comparative Example 6 and the corresponding properties thereof

| Category | Liquid crystal monomer code | Content (in parts by mass) |
|---|---|---|
|  | CC-5-V | 13 |
| II | CCP-V2-1 | 5 |
| III | PY-2O-O2 | 3 |
| III | PY-2O-O4 | 5 |
| IV | PY-3-O2 | 3 |
| IV | CCY-3-O2 | 9 |
| IV | CCOY-3-O2 | 13 |
| V | CC-2-3 | 19 |
| V | CC-4-3 | 5 |
| V | CC-3-V1 | 3 |
| V | CP-5-O2 | 3 |
| VI-1 | CCP-V-1 | 7 |
| VI-2 | CPP-1V-2 | 3 |
| VI-1 | CPP-3-2 | 4 |
| VII | Sb-Cp1O-O4 | 3 |
| VII | Sc-Cp1O-O2 | 2 |
|  | RM-4 | 0.31 |

$\Delta\varepsilon$ [1 KHz, 25° C.]: −3.0
$\Delta n$ [589 nm, 25° C.]: 0.096
Cp: 90° C.
$\gamma_1$: 118 mPa · s
K33: 17.1

CC-3-V in Example 15 is replaced by CC-5-V to form Comparative Example 6. Compared with Comparative Example 6, Example 15 differ to a smaller extent in the properties of dielectricity, refractive index, cleaning point and K33; however, Example 15 has a smaller $\gamma_1$, a smaller $\gamma_1$/K33, and a faster response. It can be seen therefrom that the liquid crystal composition of the present disclosure has the advantage of a fast response.

Obviously, the above-mentioned examples of the present disclosure are merely examples for clearly illustrating the present disclosure, rather than limiting the embodiments of the present disclosure; for a person of ordinary skill in the art, on the basis of the above description, other variations or changes in different forms may also be made, it is impossible to exhaustively give all of the embodiments thereof herein, and any obvious variation or change derived from the technical solution of the present invention is still within the scope of protection of the present invention.

The invention claimed is:

1. A liquid crystal composition, comprising: a compound represented by formula I, a compound represented by formula II, one or more compounds represented by formula III, one or more compounds represented by formula IV-3, one or more compounds represented by formula IV-4, one or more compounds represented by formula IV-8, one or more compounds represented by formula VII 1, and at least one polymerizable compound,

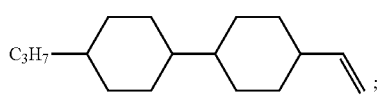

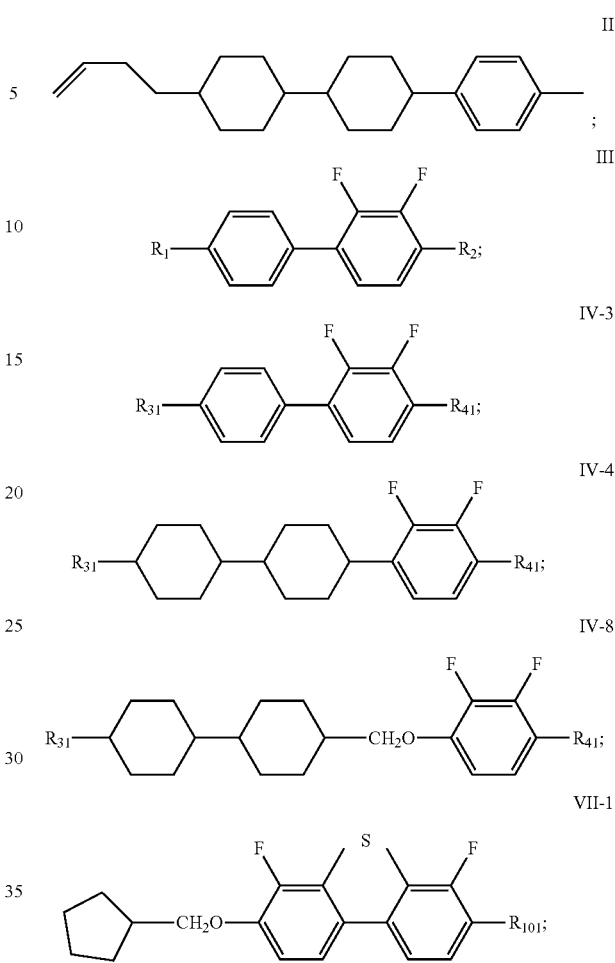

wherein in formula III, $R_1$ represents an alkoxy group having a carbon atom number of 2; R2 represent an alkoxy group having a carbon atom number of 2-4; R31 represents an alkyl group having a carbon atom number of 3; R41 represents an alkoxy group having a carbon atom number of 2; $R_{101}$ represents an alkyl group having a carbon atom number of 2-4, where a total of the components other than the polymerizable compound is 100% by mass, a total mass content of the compound represented by formula I is 1%-47%; a total mass content of the compound represented by formula II is 1%-25%; a total mass content of the compound represented by formula III is 1%-35%; a total mass content of the compound represented by formula IV-3 is 3%; a total mass content of the compound represented by formula IV-4 is 9%; a total mass content of the compound represented by formula IV-8 is 13%; a total mass content of the compound represented by formula VII-1 is 3%-8%; and the polymerizable compound is added in an amount of 0.03%-0.4% on the basis of the total mass % of the liquid crystal.

2. The liquid crystal composition according to claim 1, wherein said liquid crystal composition further comprises one or more compounds represented by formula V:

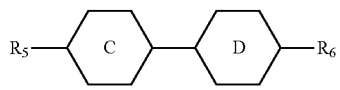

V wherein in formula V, $R_5$ and $R_6$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and

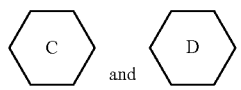

each independently represent 1,4-cyclohexylene, 1,4-cyclohexenylene or 1,4-phenylene; furthermore, where

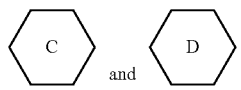

simultaneously represent 1,4-cyclohexylene, and one of $R_5$ and $R_6$ represents propyl, the other one of the $R_5$ and $R_6$ is not vinyl.

3. The liquid crystal composition according to claim 2, wherein said one or more compounds represented by formula V are selected from the group consisting of compounds represented by formulas V-1 to V-3:

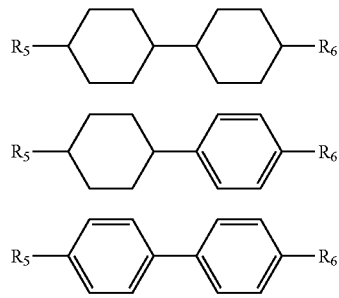

wherein
$R_5$ and $R_6$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and in formula V-1, where one of $R_5$ and $R_6$ represents propyl, the other one of the $R_5$ and $R_6$ is not vinyl.

4. The liquid crystal composition according to claim 1, wherein said liquid crystal composition further comprises one or more selected from the group consisting of compounds represented by formula VI-1 to VI-3:

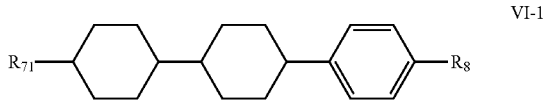

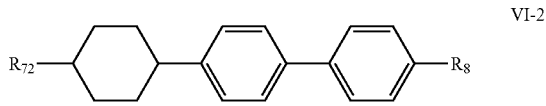

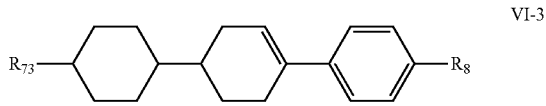

wherein
$R_{71}$ represents an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, or vinyl; and $R_{72}$, $R_{73}$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10.

5. A liquid crystal display element, comprising the liquid crystal composition of claim 1, wherein said liquid crystal display element is an active matrix addressing display element, or a passive matrix addressing display element.

6. A liquid crystal display, comprising the liquid crystal composition of claim 1, wherein said liquid crystal display is an active matrix addressing display, or a passive matrix addressing display.

* * * * *